Figure 1:
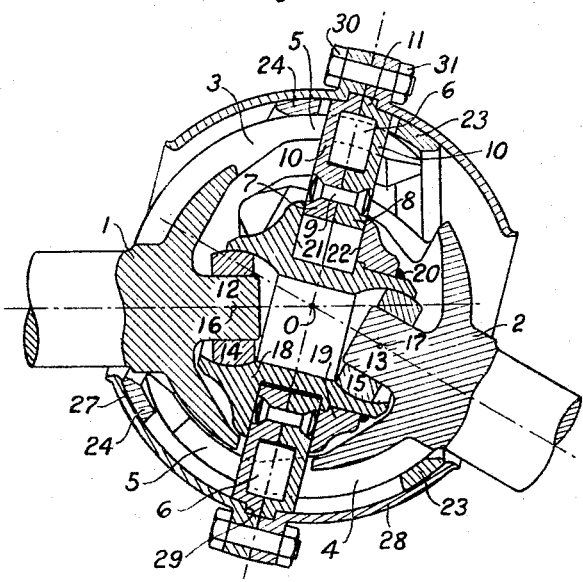

July 18, 1944.  S. G. WINGQUIST  2,353,801

UNIVERSAL JOINT

Filed July 16, 1943  2 Sheets-Sheet 1

Inventor:
Sven Gustaf Wingquist,
By Cushman Darby Cushman
Attorneys.

July 18, 1944.  S. G. WINGQUIST  2,353,801
UNIVERSAL JOINT
Filed July 16, 1943  2 Sheets-Sheet 2

Inventor:
Sven Gustaf Wingquist,
By Cushman Darby & Cushman
Attorneys.

Patented July 18, 1944

2,353,801

UNITED STATES PATENT OFFICE 2,353,801

UNIVERSAL JOINT

Sven Gustaf Wingquist, Remningstorp, Sweden

Application July 16, 1943, Serial No. 494,981
In Sweden April 7, 1943

3 Claims. (Cl. 64—21)

This invention is for improvements in and relating to universal joints having a single centre of deflection and comprising a driving and a driven joint member having arms between which are interposed transmission members for transmitting the motion between the joint members.

A joint of this type for small angular deflections may be formed with relatively short arms which under load have sufficient strength for transmitting the torque. If on the other hand the joint is to be used for larger angular deflections, say 30° or more, then the arms must be made longer and it is then difficult to make them sufficiently strong. If the joint is spherical, as is preferable, it is usual for the arms to taper off towards the inner end or base. Assuming the joint to be under load and the transmission members to be situated substantially in the bisector plane of the joint, if the velocity ratio is to be uniform, or near the bisector plane, if a certain degree of non-uniformity of the velocity ratio is to be permitted, then the arms take up the load at points at various distances from their inner ends or bases, so that in a given position of the joint the stress on some of the arms is greater than that on the other arms. Those arms which are subjected to the greater stress yield to a certain degree and thus the pressure on those arms, which otherwise would be less heavily stressed is increased until a state of balance is reached. This increased pressure on some of the arms, however, results in an undesired increase of the load on the transmission members, as will be shown in the following.

The invention has for its object to eliminate this uneven distribution of the load on the arms by transferring load, without the aid of the transmission members, from those arms which momentarily carry a greater load to those carrying a lesser load. In other words, those arms which are subjected to the greater load are supported by those subjected to the lesser load. For this purpose arms pertaining to the same joint member are at their free ends connected with each other by means of members which take up and equalize, more or less, the forces acting on the arms in a peripheral direction. These connecting members will be disposed on both sides of a transverse plane passing through the centre of deflection of the joint, and as the arms of one joint member are situated between the arms of the other joint member it is not possible for the connecting members to be made integral with the arms. In a preferred embodiment the connecting members are therefore made in the form of rings which are mounted on the arms and secured to these by means of pins, bolts or in any other suitable way. If the joint is spherical on the outside the rings or other members connecting the arms with each other may be so formed that they also serve to hold the joint members from displacement away from each other, as will be more fully described in the following.

Figure 2:
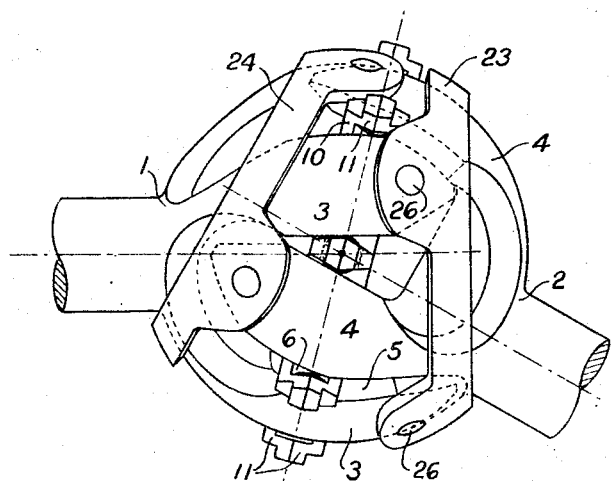
Figure 3:
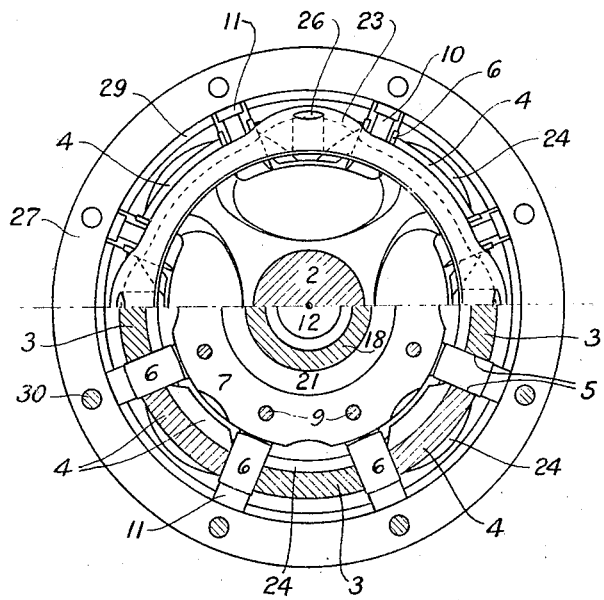
Figure 4:
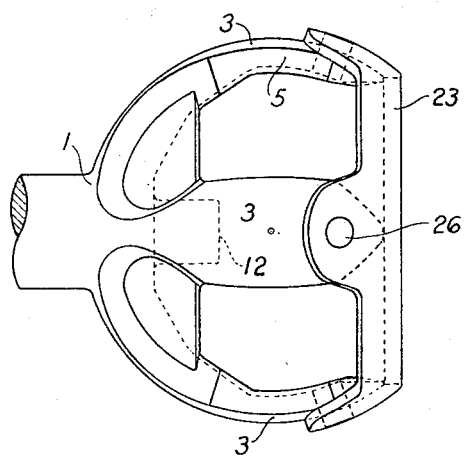

One embodiment of the invention will now be described with reference to the accompanying drawings. In these, Fig. 1 shows a longitudinal section with the shafts angularly displaced and Fig. 2 a side view, also with the shafts angularly displaced and with the housing removed. Fig. 3 shows in the upper half a transverse view with the shafts aligned and part of the housing removed, and in the lower half a transverse section. Fig. 4 shows a longitudinal view of the driving joint member.

In the figures 1 denotes the driving and 2 the driven joint member. The driving joint member has four arms 3, angularly displaced by 90° relatively to each other, and the driven joint member has four arms 4, also angularly displaced by 90° relatively to each other. Each arm is provided with two races 5, and between proximate races are disposed rollers 5. Four rollers angularly displaced by 90° relatively to each other transmit the power in one direction of rotation and the four other rollers in the opposite direction.

For guiding the rollers there is provided a roll holder made in two parts 7 and 8 held together by means of rivets 9. The roll holder is at the periphery formed with posts 10 located in pairs on both sides of the bisector plane of the joint and these posts are at their outer ends formed with parts 11 projecting over the outer ends of the rollers. The rollers are in this way supported on both sides of the bisector plane along their whole length and are also prevented from falling out of the roll holder. The rollers are further free to move in a peripheral direction in the roller pockets formed in the roll holder between the posts 10.

For guiding the rollers in the bisector plane the following means are provided.

Each joint member 1, 2 is formed with a central, inwardly directed projection 12, 13, and on these projections are mounted rings 14, 15 which are spherical at the outer periphery and have their centres 16, 17 respectively situated on the centre line of each joint member and equidistantly from the centre of deflection 0 of the joint. These spherical surfaces are embraced by corresponding spherical surfaces on the inside and at the ends of a socket-like guide member, comprising two halves 18, 19 which at 20 are secured to each other by means of welding. In the guide member 18, 19 are provided guide faces 21, 22 at right angles to the axis of the member, and between these guide faces the holder 7, 8 may slide, while in each position always remaining in a plane passing through the centre of the guide member and at right angles to the axis thereof. Owing to the symmetrical arrangement relatively to the points 16, 17 the guide member for each angle of deflection α always deviates by an angle $$\frac{\alpha}{2}$$

from the original position at right angles to the axis of the joint when the shafts are in alignment, and thus also the rollers 6, guided by the roll holder 7, 8, 10, will take up this position. The rollers are thus always guided in the bisector plane of the axes of the joint members.

The arms 3 are at their free ends connected with each other by means of a ring 23 and the arms 4 by means of a ring 24. The rings are secured to the arms by means of pins or bolts 26. In the embodiment shown the arms 3, 4 are spherical on the outside and the rings 23, 24 on the inside, relatively to the centre of deflection 0 of the joint. The rings therefore not only equalize the load, more or less, but also serve to hold the joint members from displacement away from each other, in an axial direction. In the embodiment shown the rings are further spherical on the outside and embraced by a housing 27, 28 made in two pieces and spherical on the inside. The housing is provided with an internal groove 29 which fits over the outer parts 11 of the roll holder 7, 8, 10. The housing is held together by means of bolts 30 and nuts 31. As the housing bears on the spherical rings 23, 24 these also serve to hold the joint members from displacement toward each other, in an axial direction.

The function of the joint is as follows.

When the axes of the joint members 1, 2 are in line with each other the guide member 18, 19 is coaxial with these axes and the guide faces 21, 22 thereof keep the roll holder 7, 8, 10 and thus the rollers 6 in a plane at right angles to the axis of the joint. If the axes of the joint members are deflected by an angle α, as shown in Figs. 1 and 2, then the axis of the guide member 18, 19 through the points 16, 17 forms half that angle with the axis of each joint member, while at the same time its centre is moved from the centre of deflection 0 of the joint. The roll holder, however, retains its centre in the centre of deflection 0 and therefore slides along the plane faces 21, 22 of the guide member but at the same time is forced to remain in the bisector plane. In the aligned position of the shafts the angular distances between the rollers are everywhere the same. When the shafts of the joint are deflected, however, the angular distances between the rollers are changed, so that the angular distance between two approximate rollers is either increased or decreased. In this way the rollers remain in contact with and accommodate themselves to the movement of the races. These variations of the angular distances depend as to their magnitude on the angle of deflection and are not great but they must be taken into consideration when designing the roll holder system. In the construction described they are compensated for by the rollers being movable in the roll holder in a peripheral direction.

It has been pointed out above that the arms in certain positions, as they rotate, would be subjected to an increased load if the connecting rings were not provided to prevent yielding of the arms. From Fig. 2 it will be seen that those arms which are uppermost in the figure have the load at their outer ends and thus are subjected to the greatest bending stress. If these arms yield to the load there is a corresponding increase of the load on the other arms, thus also on those arms which in the figure are located on both sides of the centre. If the load on these latter arms is increased then also the wedging action on the roller interposed between the arms, i. e. the roller in the centre of Fig. 2, is increased and this means an increase of the forces acting at right angles to the bisector plane which have to be taken up by the roll holder and the guide member. The rings 23, 24 connecting the free ends of the arms now equalize the load on the arms, more or less, and thus also on the rollers, so that overloading of these latter is avoided.

The effect of the rings 23, 24 for holding the joint members from displacement away from each other will be obvious. It will be seen from Figs. 1 and 2 that the rings from the roll holder extend a fair way down the spherical surface of the joint. The force exerted by the arms against the insides of the rings, which force is always directed through the centre of deflection of the joint, is therefore applied at a favourable angle relatively to the axis of the joint. The farther out on the ends of the arms the rings can be placed or made to extend the more favourable will be the angles at which the forces for preventing displacement of the joint members are applied.

It is obvious that various changes can be made in the details of the construction and arrangement of the parts within the scope of the appended claims without departing from the invention. The number of the arms may be greater or smaller than that shown in the figures, the rollers may be differently shaped or may be replaced by balls or other suitable transmission members, the roll holder may be differently constructed, the rollers need not be movable in a peripherial direction in roller pockets but may be disposed in holders which themselves are movable in this way, the means for guiding the roll holder in the bisector plane or substantially in this plane may be differently constructed, it is not necessary for the joint to be spherical, nor for the rings 23, 24 and these latter may be replaced by other members connecting the arms and equalizing the load, the joint may be made for transmission of power in one direction of rotation only, and so on. Generally speaking the invention includes all universal joints to which the inventive idea described above is applicable.

What I claim is:

1. Universal joint having a single centre of deflection and comprising a driving and a driven joint member, both spherical on the outside relatively to the centre of deflection of the joint, arms on the joint members, transmission members interposed between the arms, and rings mounted on the outside of the arms at the free ends thereof and rigidly connecting the arms with each other in a peripherial direction, the rings being spherical on the inside relatively to the centre of deflection of the joint and bearing on the outer spherical faces of the joint members for holding these from displacement away from each other.

2. Universal joint having a single centre of deflection and comprising a driving and a driven joint member, arms on said joint members, transmission members interposed between the arms, rings mounted on the outside of the arms at the free ends thereof and rigidly connecting the arms with each other in a peripherial direction, and a housing embracing the joint members, the rings being spherical on the outside and the housing on the inside, relatively to the centre of deflection of the joint, and the housing bearing on the rings for holding the joint members from displacement toward each other.

3. Universal joint having a single centre of deflection and comprising a driving and a driven joint member, both spherical on the outside relatively to the centre of deflection of the joint, arms on said joint members, transmission members interposed between the arms, rings mounted on the outside of the arms at the free ends thereof and rigidly connecting the arms with each other in a peripherial direction, the rings being spherical on the inside relatively to the centre of deflection of the joint and bearing on the outer spherical faces of the joint member for holding these from displacement away from each other, and a housing embracing the joint members, the rings being spherical on the outside and the housing on the inside, relatively to the centre of deflection of the joint, and the housing bearing on the rings for holding the joint members from displacement toward each other.

SVEN GUSTAF WINGQUIST.